United States Patent
Zaugg

(10) Patent No.: US 7,021,778 B1
(45) Date of Patent: Apr. 4, 2006

(54) COMPACT-DEPTH SPIRAL TELESCOPE AND METHOD OF MAKING AND USING THE SAME

(75) Inventor: Thomas Zaugg, Ypsilanti, MI (US)

(73) Assignee: General Dynamics Advanced Information Systems, Inc., Arlington, VA (US)

( * ) Notice: Subject to any disclaimer, the term of this patent is extended or adjusted under 35 U.S.C. 154(b) by 0 days.

(21) Appl. No.: 10/948,353

(22) Filed: Sep. 24, 2004

(51) Int. Cl.
  *G02B 17/00* (2006.01)
(52) U.S. Cl. ........................... 359/861; 359/365
(58) Field of Classification Search ........ 359/346–366, 359/850–861
  See application file for complete search history.

(56) References Cited

U.S. PATENT DOCUMENTS

| | | | | |
|---|---|---|---|---|
| 4,793,694 A | * | 12/1988 | Liu | 359/494 |
| 4,822,156 A | * | 4/1989 | Hugenell | 359/853 |
| 5,078,502 A | | 1/1992 | Cook | |
| 5,108,168 A | * | 4/1992 | Norbert et al. | 359/419 |
| 5,113,064 A | * | 5/1992 | Manhart | 250/201.9 |
| 5,379,157 A | | 1/1995 | Wang | |
| 5,386,316 A | * | 1/1995 | Cook | 359/365 |
| 5,485,306 A | | 1/1996 | Kiunke et al. | |
| 5,537,249 A | * | 7/1996 | Masunaga et al. | 359/407 |
| 5,604,782 A | * | 2/1997 | Cash, Jr. | 378/85 |
| 5,856,888 A | * | 1/1999 | Ross et al. | 359/857 |
| 5,905,591 A | * | 5/1999 | Duncan et al. | 359/399 |
| 5,930,055 A | | 7/1999 | Eisenberg | |
| 6,016,220 A | | 1/2000 | Cook | |
| 6,084,727 A | | 7/2000 | Cook | |
| 6,120,156 A | | 9/2000 | Akiyama | |
| 6,178,047 B1 | | 1/2001 | Cook | |
| 6,259,558 B1 | | 7/2001 | Fischer et al. | |
| 6,268,963 B1 | | 7/2001 | Akiyama | |
| 6,513,935 B1 | | 2/2003 | Ogawa | |
| 6,535,340 B1 | | 3/2003 | Saruwatari | |

(Continued)

FOREIGN PATENT DOCUMENTS

GB  2108283 A  *  5/1983

(Continued)

OTHER PUBLICATIONS

Robert E. Introne, "Evaluation of Spectral Issues in Sparse Aperture Imaging Systems", Abstract (available prior to Sep. 24, 2004).

*Primary Examiner*—Drew A. Dunn
*Assistant Examiner*—Mark Consilvio
(74) *Attorney, Agent, or Firm*—Michael J. Bell; Howrey LLP

(57) ABSTRACT

The invention according to a first aspect may include an optical system. The optical system may have an axial axis. This optical system may have a number of primary mirror segments. A number of reflectors may be arranged about the axial axis. The primary mirror segments may be configured to reflect a number of principal rays along a first set of chords to corresponding reflectors. These reflectors may be configured to reflect the corresponding principal rays along a second set of chords. Both the first set of chords and the second set of chords may have an angle in excess of 45 degrees with respect to the direction of the axial axis. The invention according to a first aspect may also include a second set of reflectors. The second set of reflectors may be configured to direct the light to an image plane. Other aspects of the invention may include a method of receiving light using an optical system configured to spiral light though the system and a method of making such a system.

13 Claims, 7 Drawing Sheets

U.S. PATENT DOCUMENTS

| | | |
|---|---|---|
| 6,571,069 B1 | 5/2003 | Ishikawa et al. |
| 6,705,736 B1 * | 3/2004 | Pressler ..................... 359/853 |
| 2002/0041453 A1 | 4/2002 | Sekita et al. |
| 2002/0131168 A1 | 9/2002 | Sadler |
| 2002/0154395 A1 | 10/2002 | Mann et al. |
| 2003/0063400 A1 | 4/2003 | Sunaga et al. |
| 2003/0147163 A1 | 8/2003 | Yoshikawa et al. |
| 2003/0169493 A1 * | 9/2003 | Draganov et al. .......... 359/399 |
| 2004/0051878 A1 * | 3/2004 | Rhoads ....................... 356/521 |

FOREIGN PATENT DOCUMENTS

| | | |
|---|---|---|
| JP | 06186480 A * | 7/1994 |

\* cited by examiner

COMPACT-DEPTH SPIRAL TELESCOPE AND METHOD OF MAKING AND USING THE SAME

FIELD OF THE INVENTION

The present invention relates to a compact-depth spiral telescope and a method of making and using the same. More particularly, the present invention relates to a telescope having a reduced depth compared to conventional telescope designs of comparable performance.

BACKGROUND OF THE INVENTION

Telescopes have been used for hundreds of years to magnify the images of distant objects. In 1672, Sir Isaac Newton developed what was believed to be the first reflective telescope. This type of telescope has become known as a Newtonian telescope. One specific type of a Newtonian telescope is a Gregorian telescope. Gregorian telescopes may be used in applications where upright images are required and in applications that cannot tolerate strong optical aberration. Traditional Gregorian telescopes have a primary mirror and a secondary mirror, where the distance between the primary mirror and the secondary mirror is greater than the focal length of the primary mirror. Other types of telescopes may include, for example, those employing refractive, reflective or catadioptic systems.

One problem of such systems is encountered when large optical telescopes are deployed, for example, extra-terrestrially. A limiting factor in telescope design is the launch-vehicle capacity. Such large telescopes quickly meet the payload capacities of launch-vehicles. One solution to this problem was the use of sparse aperture telescopes. Alternatively, or in conjunction with a sparse aperture telescope, telescope arrays have also been used. These telescopes have just recently been realized and may be able to reduce the weight and size of the system below that for a fully-filled aperture system. Sparse aperture telescopes may be able to increase the effective diameter of an optical system while reducing the overall weight and stowable size of the system. Generally speaking, a sparse aperture system synthesizes the light received from a number of smaller apertures, known as sub-apertures that are phased to form a common image field. This configuration enables the increase of the effective aperture size, while avoiding the difficulties associated with manufacturing and transporting a large monolithic mirror.

An additional solution to the problems associated with large telescope designs is to segment the primary mirror of the telescope. Segmenting the primary mirror of the telescope permits telescopes with larger aperture dimensions. Sparse apertures can be used to maximize resolving power given a mass constraint. However, for such systems, a significant fraction of the mass budget is typically devoted to the superstructure necessary to achieve the required levels of stability and rigidity. This is due to the axial extent of the system, or "depth". This depth is usually much larger than the aperture extent. A reduction in the depth of a sparse aperture system may be achieved by employing an array of telescopes, but the optics required to optically combine the telescopes to image at a single image plane is very complex and may result in field-of-regard and throughput limitations.

What is needed is a telescope with a reduced depth to permit higher-powered telescopes to be carried by traditional launch-vehicles. Additionally, what is needed is a telescope that has a length measured in an axial direction that is substantially reduced as compared with traditional telescopes, while being configured with the same aperture size. Also, what is needed is a telescope that does not require complex optical systems for the combination of outputs from a number of telescopic systems.

SUMMARY OF THE INVENTION

Thus, the present invention seeks to address at least some of the foregoing problems identified in prior art telescopic systems. Thus, the present invention may be configured such that the length of the telescope measured along an axial axis is substantially reduced as compared with traditional telescopic systems. Furthermore, the superstructure of an optical system, such as, for example, a telescope or a beam expander, may be substantially reduced when compared to traditional optical systems.

The invention according to a first aspect may include an optical system. The optical system may have an axial axis. This optical system may have a number of primary mirror segments. A number of reflectors may be arranged about the axial axis. The primary mirror segments may be configured to reflect a number of principal rays along a first set of chords to corresponding reflectors. These reflectors may be configured to reflect the corresponding principal rays along a second set of chords. Both the first set of chords and the second set of chords may have an angle of in excess of 45 degrees with respect to the direction of the axial axis. The invention according to a first aspect may also include a second set of reflectors. The second set of reflectors may be configured to direct the light to an image plane.

According to one embodiment of the present invention, the telescope may be configured to reduce the depth of the optical system. This depth reduction may be along the axial axis of the optical system. The optical system may be configured to form an image of the source in the image plane. Furthermore, the reflectors may be mirror segments arranged around the axial axis of the optical system. These mirror segments may be secondary mirror segments in the optical system. The optical system may be configured to receive light at a first end of the optical system and the second set of reflectors may be disposed at the second end of the optical system. Depending on the overall system configuration and particularly, the orientation of the second set of mirrors, the image plane may be located substantially at the second end of the system. According to another embodiment of the present invention, the image plane may be located at a plane beyond the second end of the system. Alternatively, the image plane may be arranged at the first end of the system. According to yet another aspect of the invention, the system may include a substantially circular input aperture, which may be defined by a substantially elliptical reflector. According to another aspect of the invention, the reflectors may be fold mirrors. According to another embodiment of the invention, the input aperture may include a first mirror and a second mirror. Additionally, the first mirror may be configured to have a cross section that has a parabolic component. The optical system may be configured to function, for example, as a telescope or a beam expander.

A method according to a second aspect of the present invention may include, for example, receiving light from a source. This source may be, for example, a distant source of light such as a star or other celestial body. The method according to a second aspect of the present invention may also include reflecting a principal ray associated with the received light along a number of chords. These chords may have an angle of at least 45 degrees with respect to the direction of the axial axis. The method according to the second aspect of the present invention may also include directing the light received from the source to an image plane.

The method according to a second aspect of the present invention may also include receiving the light using a plurality of reflectors disposed about the axial axis of an optical system. This optical system may have a first end and a second end. The first end may be disposed closer to the source than the second end. Additionally, the step of reflecting may be performed by a reflector. This reflector may be located proximate to the second end, for example.

A method of making a compact-depth telescope may include, for example, segmenting a primary reflector. Additionally, the method of making a compact-depth telescope may include determining a reflector pitch. The reflector pitch may be determined such that the first set of chords and the second set of chords have an angle in excess of 45 degrees with respect to the direction of the axial axis so as to reflect the light a number of times from an associated set of reflectors located within an interior volume of the compact-depth telescope. Furthermore, the method may include, for example, segmenting a second reflector.

The method of making a compact-depth telescope according to another aspect of the present invention may include, for example, disposing a number of mirrors within an interior volume of the compact-depth telescope. Additionally, the step of segmenting the primary reflector may include segmenting a primary reflector such that the primary reflector includes a number of elliptically-spaced reflector sections. According to yet another aspect of the present invention, a method of making a compact-depth telescope may include disposing the mirrors within the volume of the compact-depth telescope, where the mirrors are fold mirrors.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE INVENTION

The present disclosure will now be described more fully with reference the to the Figures in which various embodiments of the present invention are shown. The subject matter of this disclosure may, however, be embodied in many different forms and should not be construed as being limited to the embodiments set forth herein.

Figure 1:
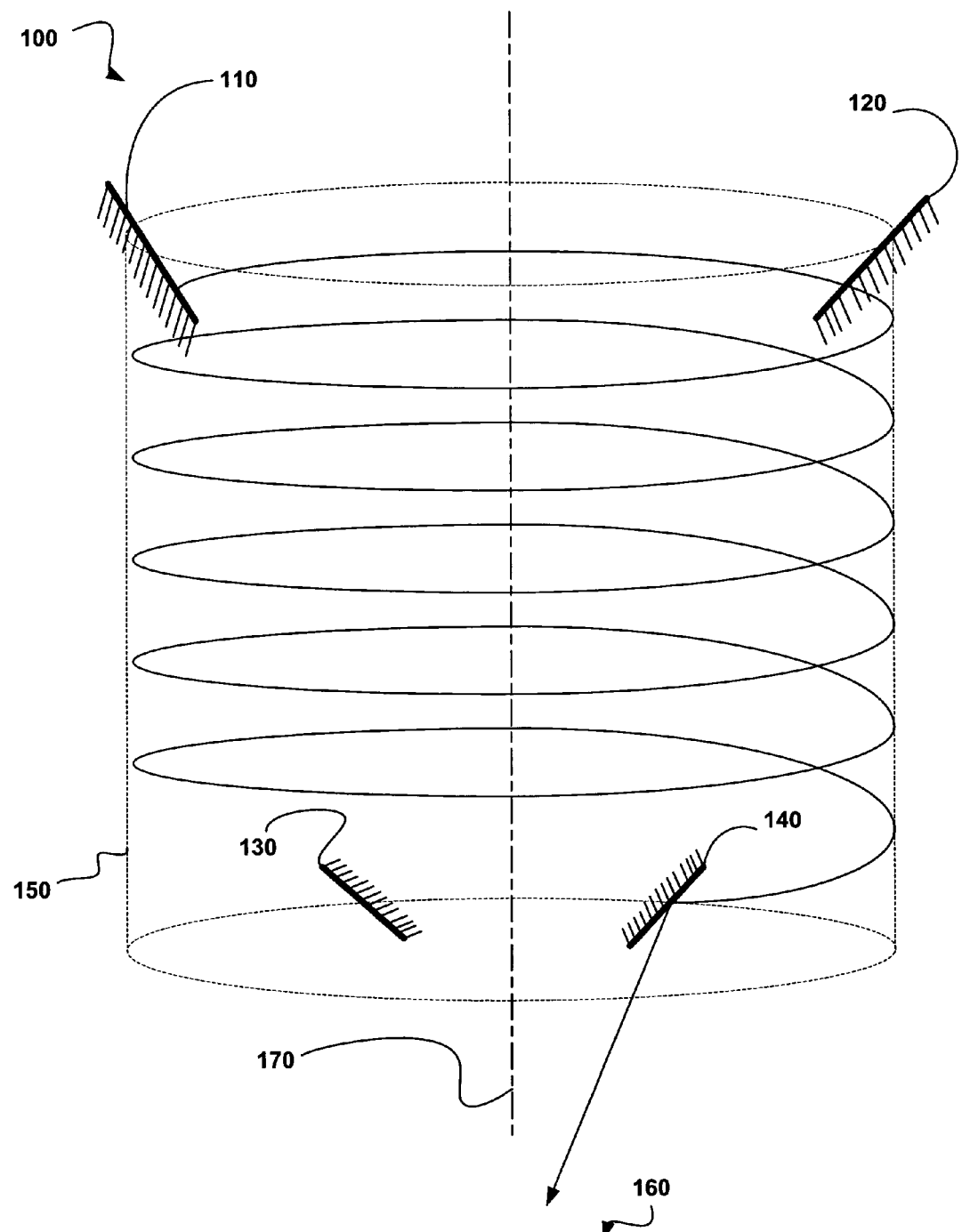
FIG. 1 shows an example of how light received from a source "spirals" through an optical system according to one aspect of the present invention.

FIG. 1 shows an example of how light received from a source "spirals" through an optical system according to one aspect of the present invention. One or more primary reflectors 110, 120 that form the input aperture of the optical system 100 may receive light. While FIG. 1 shows two primary reflectors 110, 120 configured to act as input apertures, one of ordinary skill in the art will realize that more than two primary reflectors may be used. For example, eighteen or more reflectors may be used as the input aperture of the optical system 100. In the embodiment illustrated in FIG. 1, received by the primary reflectors 110, 120 may be "spiraled" through the volume 150 of the optical system. The volume 150 of the optical system 100 may be defined by superstructure and a number of reflectors (not shown) arranged about the axial axis 170 of the optical system 100. The light received by the primary reflectors 110, 120 may be reflected to a secondary reflector within the volume 150 of the optical system 100 along a chord. The mirrors may be configured such that the chord is at an angle in excess of 45 degrees with respect to the axial axis 170 of the optical system 100. The chord angle may be, for example, between 45° and 89° with respect to the axial axis. According to one embodiment of the present invention, the angle may be, for example, between 65° and 85°. Any angles may be used that may achieve depth compression of the telescope by effectively spiraling the light about the axial axis. In one embodiment of the invention, the mirrors may be configured such that the chord is at an angle in excess of 45 degrees with respect to the axial axis of the optical system.

In the example shown in FIG. 1, the light may be reflected multiple times within the volume 150 of the optical system 100, so that the light effectively spirals through the volume along a number of chord spans as it descends through the optical system 100. The light may be received by a set of reflectors 130, 140. This set of reflectors 130, 140 may be configured to receive light that has been reflected along at least one chord span that has an angle in excess of 45 degrees with respect to the axial axis, and may direct that light to an image plane 160. Alternatively, the light may be reflected along at least one chord span that has an angle with respect to the axial axis of the optical system such that the depth of the optical system is substantially compressed. The depth may be, for example, the dimension of the telescope along the axial axis of the telescope. Thus, the optical system 100 may be configured as a telescope.

Although the term "spiral" may be used in connection with the present invention, it is to be understood that the light does not travel in an arcuate path as it descends through the volume 150 of the optical system, but rather that the light is reflected along at least one chord within a volume 150 of the optical system 100 at an angle in excess of 45 degrees with respect to the axial axis of the optical system 100. Additionally, while the term "chord" is traditionally used to identify a straight line linking two points on a circle, it should be noted that the optical system need not be circular in cross section in a geometrical sense, nor does the volume need to be perfectly cylindrical. A chord as used herein may be defined as the path length from one reflective surface and another reflective surface such that the light propagates at an angle in excess of 45 degrees with respect to an axial axis in a three-dimensional optical system.

Figure 2A:
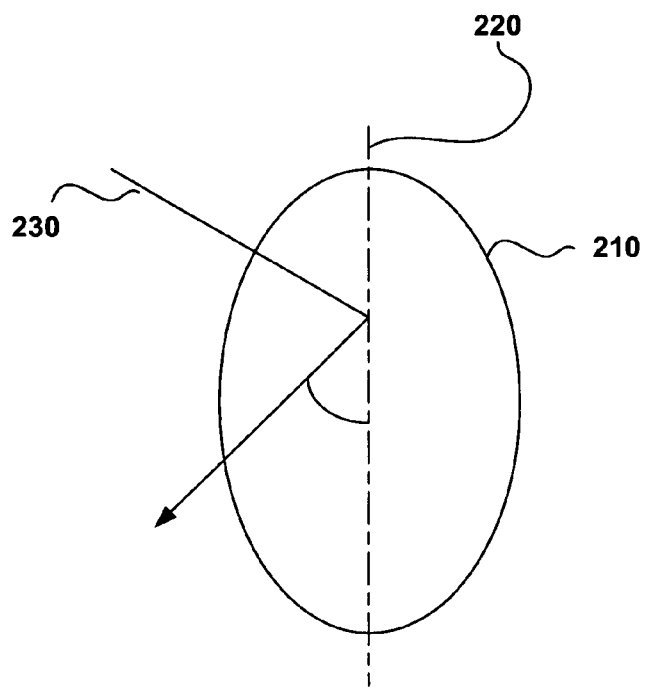
FIGS. 2A and 2B show examples of reflector geometry according to an aspect of the present invention.
Figure 2B:
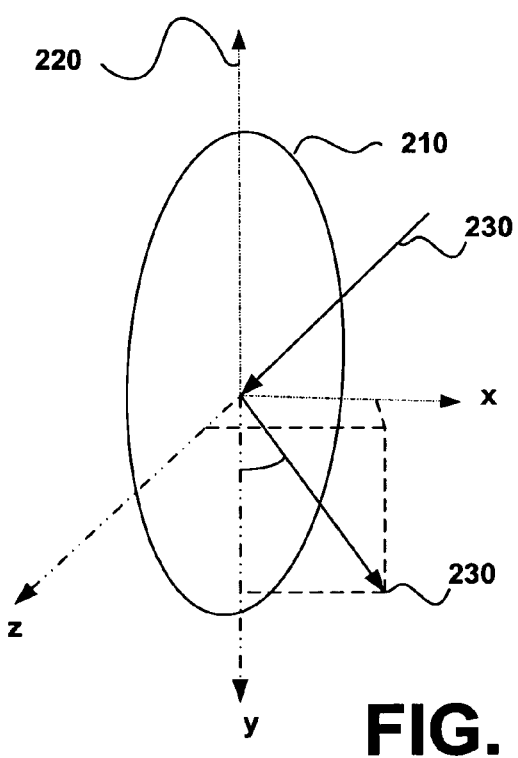

FIGS. 2A and 2B show examples of reflector geometry according to an aspect of the present invention. For example, in FIG. 2A, a reflector 210 may be disposed about an axial axis of an optical system (not shown). As shown in FIG. 2A, the dashed line 220 is substantially parallel to the axial axis of the optical system. Therefore, light, represented by the ray 230 received at the reflector 210 may be directed at an angle α with respect to the axial axis of the optical system, i.e., because line 220 is substantially parallel to the axial axis of the optical system, light ray 230 will form substantially the same angle with respect to the line 220 as it would with respect to the axial axis of the optical system.

FIG. 2B shows the same concept illustrated in FIG. 2A in three dimensions. As described above, line 220 may be substantially parallel to the axial axis of the optical system. A reflector 210 may be configured to receive light and reflect that light along a chord at an angle α with respect to the axial axis of the system. This angle α may be at an angle of at least 45 degrees with respect to the axial axis of the optical system. As shown in FIG. 2B, the light ray 230 may be represented by a three-dimensional vector having an x-component, a y-component, and a z-component, such that the light ray 230 is directed to an associated mirror along a chord. Thus, the light ray may effectively "spiral" through the optical system prior to being directed to the image plane. This folding of the optical path permits a substantial reduction in the depth of the optical system.

Figure 3:
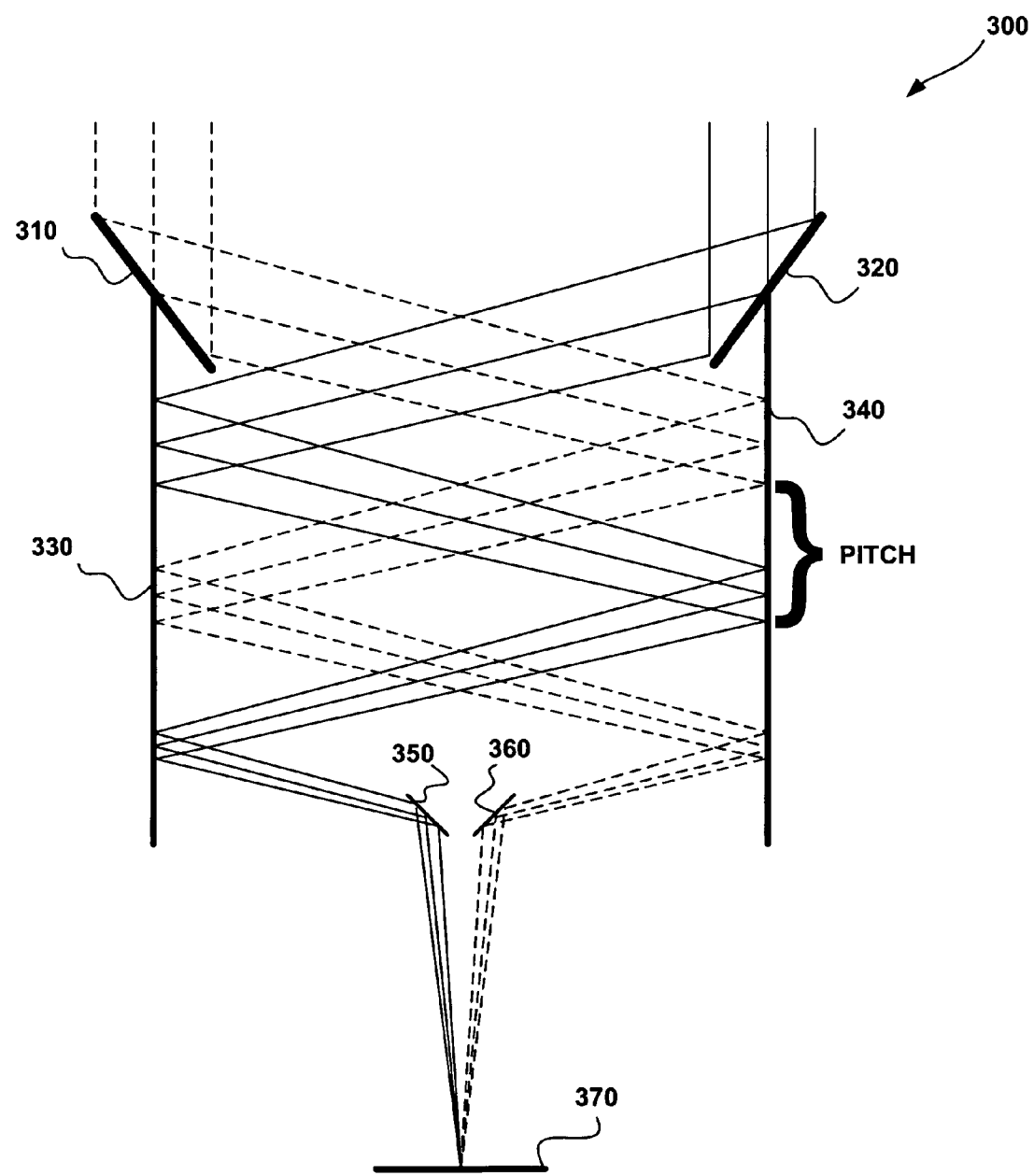
FIG. 3 shows an example of a compact optical system according to one embodiment of the present invention.

FIG. 3 shows an example of a compact optical system 300 according to one embodiment of the present invention. The compact optical system 300 may be configured as, for example, a telescope. The optical system 300 may include a first primary reflector 310 and a second primary reflector 320. The first primary reflector 310 and the second primary reflector 320 may be, for example, a segmented primary mirror. The first primary reflector 310 and the second primary reflector 320 may be configured to receive light from a remote source and reflect the received light into the optical system. Thus, FIG. 3 shows two segments of a sparse-aperture spiral optical system. In this embodiment of the present invention, the first primary reflector segment 310 and the second primary reflector segment 320 may be configured to reflect a chief ray for each segment through the axial axis of the telescope. A first flat mirror 330 and a second flat mirror 340 may be configured to reflect the chief rays across the interior of the telescope. A second set of reflectors 350, 360 may be configured to direct the light from the first primary reflector segment 310 and the second primary reflector segment 320 to the image plane 370.

This exemplary embodiment of the present invention illustrates one concept of the invention: all light paths corresponding to each sub-aperture of a sparse aperture imaging system may be independently folded in an arbitrary fashion so long as they are brought into register at the image plane 370. Thus, as shown in FIG. 3, the light incident on the first primary mirror segment 310 and the second primary mirror segment 320 may be reflected back and forth between the first flat mirror 330 and the second flat mirror 340 until a final set of mirrors 350 and 360 direct the light to the image plane 370. The first flat mirror 330 and the second flat mirror 340 may be configured to be substantially parallel to one another. By configuring the optical system 300 to fold the light paths in this manner, a long-focal-length telescope may be significantly compressed in depth, i.e., along the direction of the telescope axis.

Figure 4:
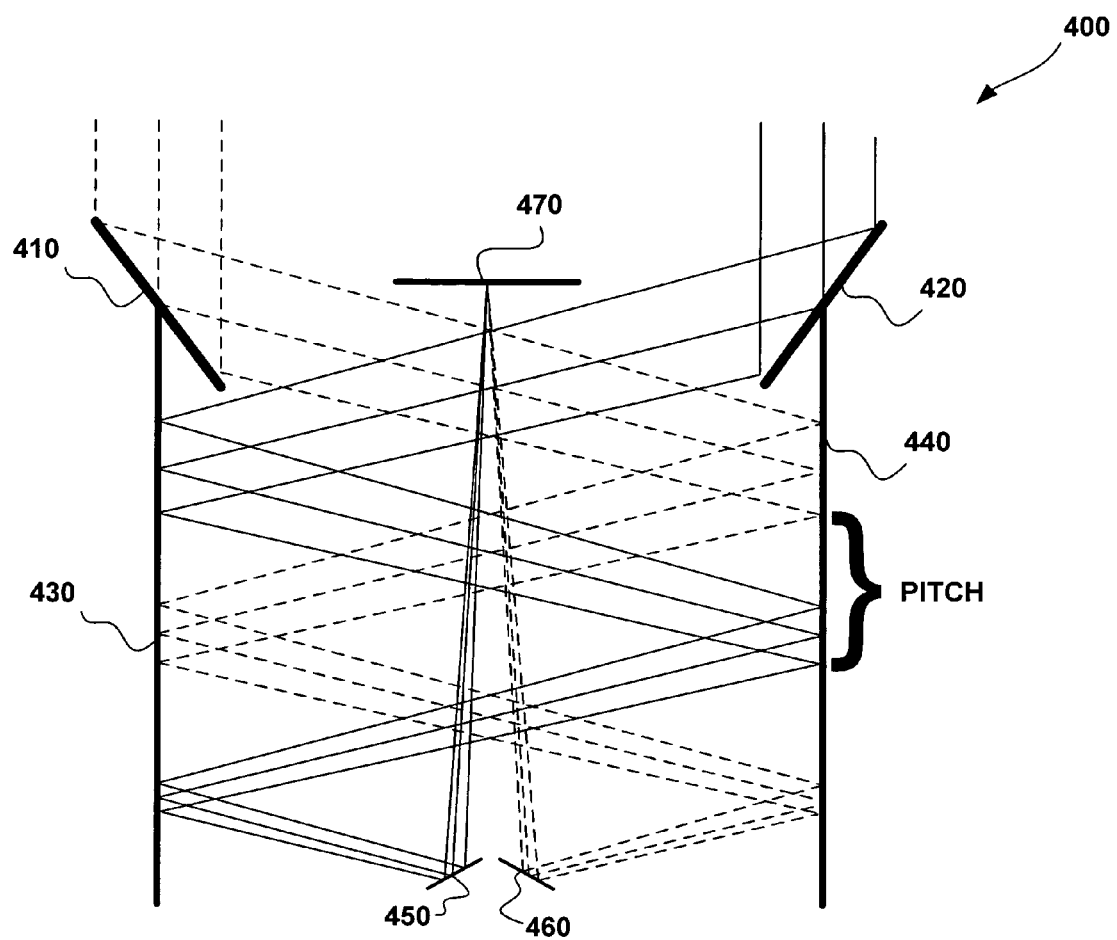
FIG. 4 shows another example of a compact optical system according to another embodiment of the present invention.

FIG. 4 shows another example of a compact optical system according to another embodiment of the present invention. FIG. 4 is similar to FIG. 3 in that the optical system 400 may be configured to include a first primary segmented reflector 410 and a second primary segmented reflector 420 that are configured to receive light from a remote source and to reflect the chief ray through the telescope axis. After the light is reflected from the first primary reflector segment 410 and the second primary reflector segment 420, the light may be reflected back and forth between a first flat mirror 430 and a second flat mirror 430. The first flat mirror 430 and the second flat mirror 440 may be configured so as to be substantially parallel to one another. The light may be received by a set of reflectors 450 and 460, which may be configured to direct the light back through the optical system 400 to an image plane 470. The embodiment of the invention illustrated in FIG. 4 may be configured to further reduce the depth of the optical system as compared to the embodiment of the invention illustrated in FIG. 3.

Figure 5:
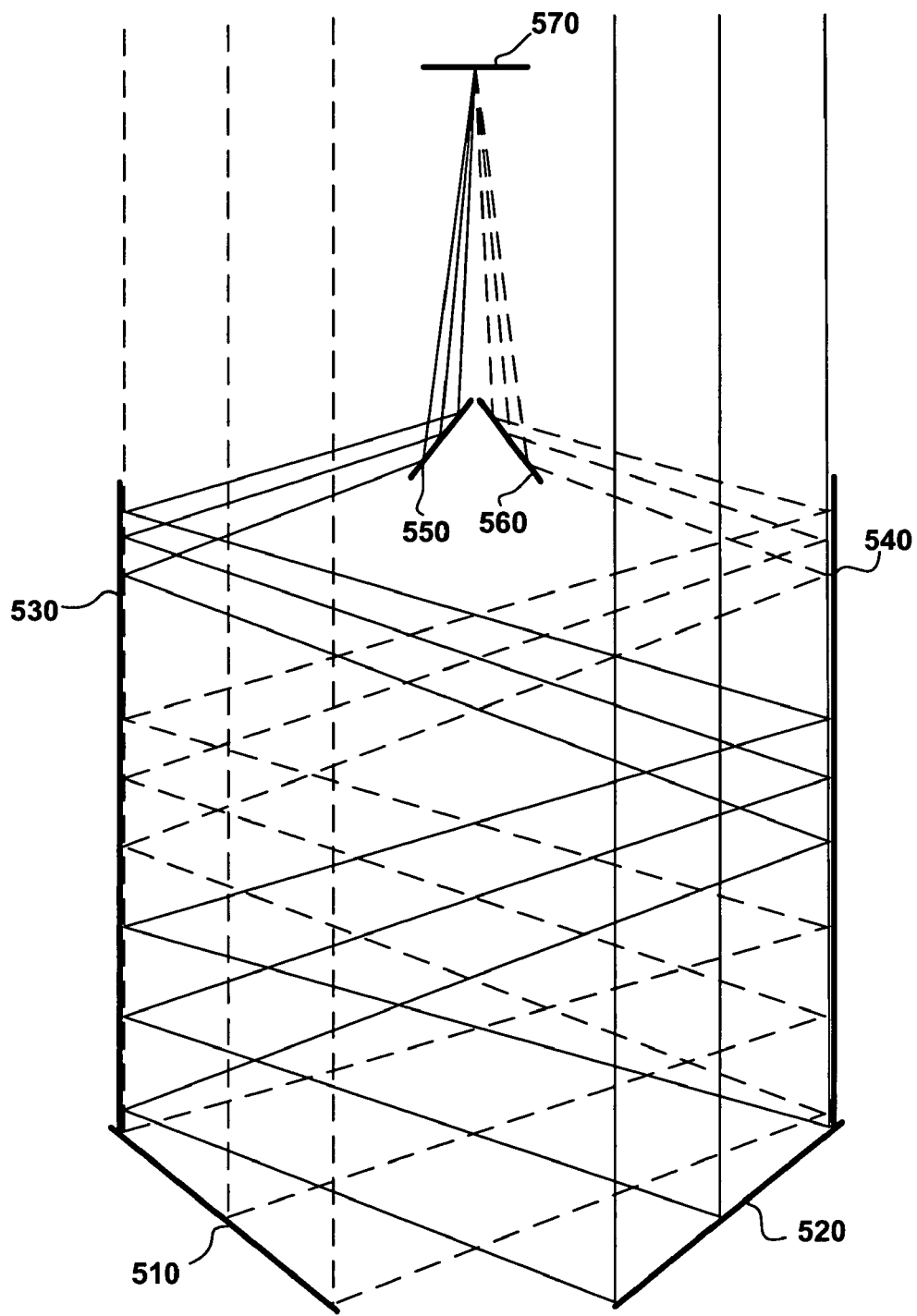
FIG. 5 shows yet another example of a compact optical system according to yet another embodiment of the present invention.

FIG. 5 shows yet another example of a compact optical system according to yet another embodiment of the present invention. FIG. 5 is similar to the embodiments of the present invention illustrated in FIGS. 3 and 4, however, in the embodiment illustrated in FIG. 5, the first primary reflector segment 510 and the second primary reflector segment 520 are arranged at an end of the optical system that is furthest from the source. In this exemplary embodiment of the present invention, the light may be spiraled upwards through the optical system 500. When the first primary reflector segment 510 and the second primary reflector segment receive the light from the source (not shown), a chief ray may be directed through an axial axis of the optical system 500. The first primary reflector segment 510 and the second primary reflector segment 520 may be configured to direct the light received from the source to one of a first flat mirror 530 and a second flat mirror 540, such that the light is reflected back and forth between the first flat mirror 530 and the second flat mirror 540. The light may be directed to an image plane 570 by a set of reflectors 550 and 560. As with FIG. 4, the set of reflectors 550 and 560 may be configured to direct the light back through the optical system to an image plane located proximate to the first primary reflector segment 510 and the second primary reflector segment 520. While specific embodiments of the invention have been shown as telescopic systems, the present invention may also be configured as a beam expander by reversing the direction of the rays of light as they propagate through the optical system. Thus, the term optical system may include both imaging systems and beam expansion systems, for example.

The two segment systems described with respect to FIGS. 3–5 are degenerate examples of a spiral telescope according to various embodiments of the present invention. In the general case, however, the light incident on multiple segments may be reflected so as to spiral around the telescope axis, traveling along the chords. Several examples are shown in FIGS. 6A–6D for a twelve segment system. The differences between these systems may be characterized in that the fraction of the circle subtended by the chord varies. This may be a function of the angle of the reflectors. The chord span may be, for example, the fraction of the circle subtended by each chord.

Figure 6A:
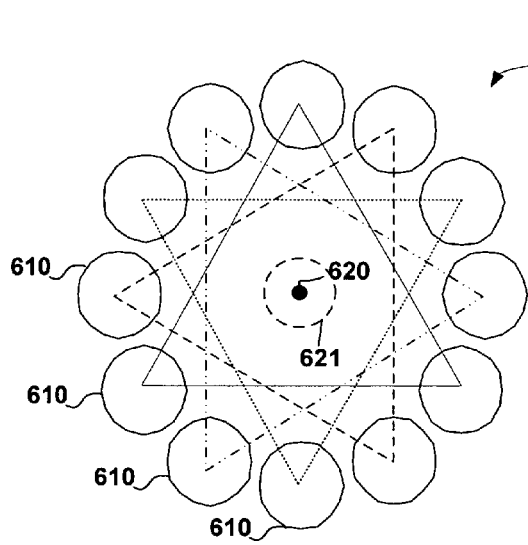
FIGS. 6A–6D show various reflector configurations and chord spans according to various embodiments of the present invention.
Figure 6B:
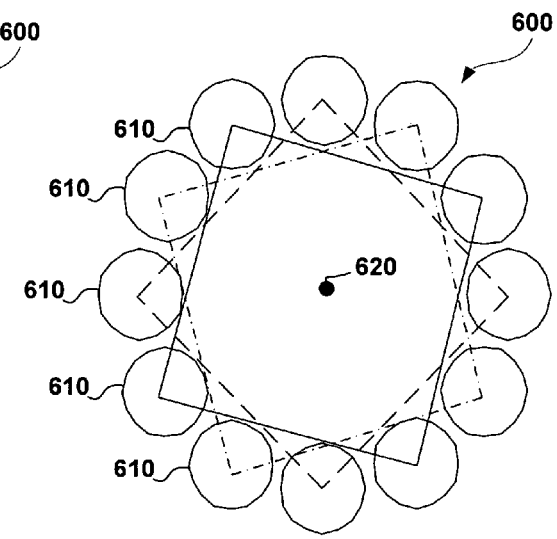
Figure 6C:
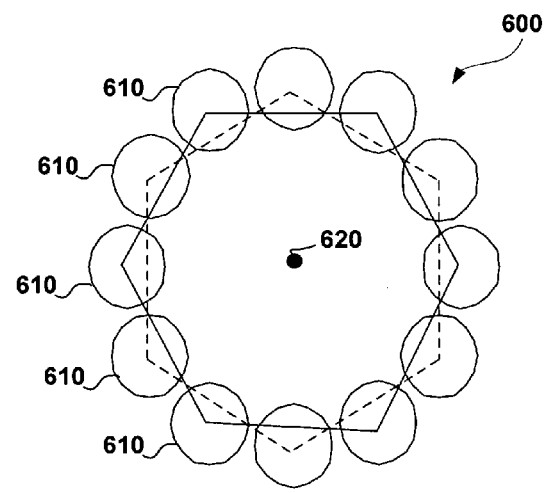
Figure 6D:
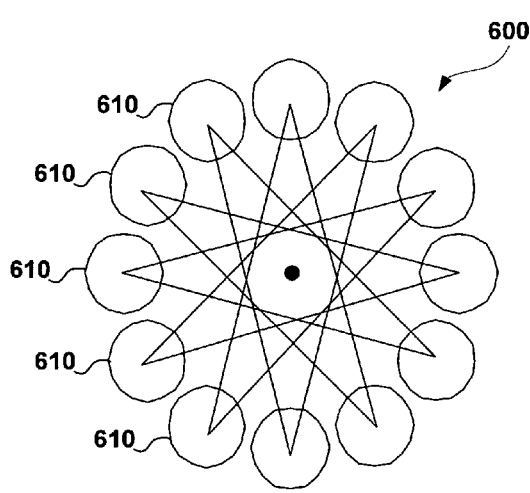

FIG. 6A shows an exemplary configuration of an optical system having twelve segments. In the embodiment illustrated in FIG. 6A, reflector segments 610 may be arranged about an axial axis 620 of the optical system 600. The embodiment shown in FIG. 6A may be configured to have chord spans of ⅓. FIG. 6B shows another exemplary configuration of an optical system having twelve segments according to a second embodiment of the present invention. Reflector segments 610 may be arranged about an axis 620 of the optical system. In the embodiment shown in FIG. 6B, the chord spans may be ¼. Likewise, FIG. 6C shows an exemplary embodiment of the present invention including a twelve-segment system. The twelve-segment system may be configured to reflect light along a number of chords such that the chord span is ⅙. FIG. 6D shows an exemplary embodiment of the present invention having twelve segments according to another embodiment of the present invention. The twelve-segment system may be configured to reflect light along a number of chords such that the chord span is 5/12.

As shown in FIGS. 6A–6D, the primary mirror segments 610 are tilted. Thus, the mirrors may have an elliptical shape in order to have the circular projections shown in FIGS. 6A–6D. These mirror shapes are merely exemplary, as any shape may be used. Thus, the mirror segments may be, for example, trapezoidal, rectangular, or triangular.

The pitch of the chords traversing an interior volume of the optical system may be defined as the change in the z-coordinate (along the telescope axis) of the chief ray as it traverses a single chord. The pitch ratio may be defined as the ratio of the pitch to optical path length along a single chord, and may be inversely proportional to the depth compression achieved by the spiral telescope compared to a corresponding conventional design. Thus, the transverse chord length may be given by:

$$c_x = 2(1-r)\sin\left(\frac{\phi}{2}\right),$$

where r is the radius of the sub-aperture (assuming that an aperture radius that is normalized to one) and φ is the chord span in radians. The minimum pitch may be defined by:

$$c_z = 2r\sqrt{\frac{c_x}{c_x + 4r}}.$$

Additionally, the chord length is given by:

$$c = \sqrt{c_x^2 + c_z^2}.$$

Thus, for example, in an embodiment in which the radius of the sub-aperture ("r") is 0.14, the pitch ratio may be, for example, 0.158. This pitch ratio may correspond to a depth compression factor of 6.3. The depth compression factor may be defined as the inverse of the ratio of the axial length of the spiral telescope system to the axial length of a corresponding conventional telescope system with the same focal length, or more precisely, the axial distance between the primary and secondary mirrors. In an embodiment of the present invention including 18 sub-apertures, this configuration may have a fill ratio of 35%. The fill ratio may be defined as the ratio of the aperture area to the area of a circle circumscribing the entire aperture. Reducing the sub-aperture size may allow for better depth compression, but also may reduce the fill factor. Circular apertures may not necessarily be the optimal configuration for the sub-apertures and therefore, alternative aperture configurations may be employed.

Figure 7:
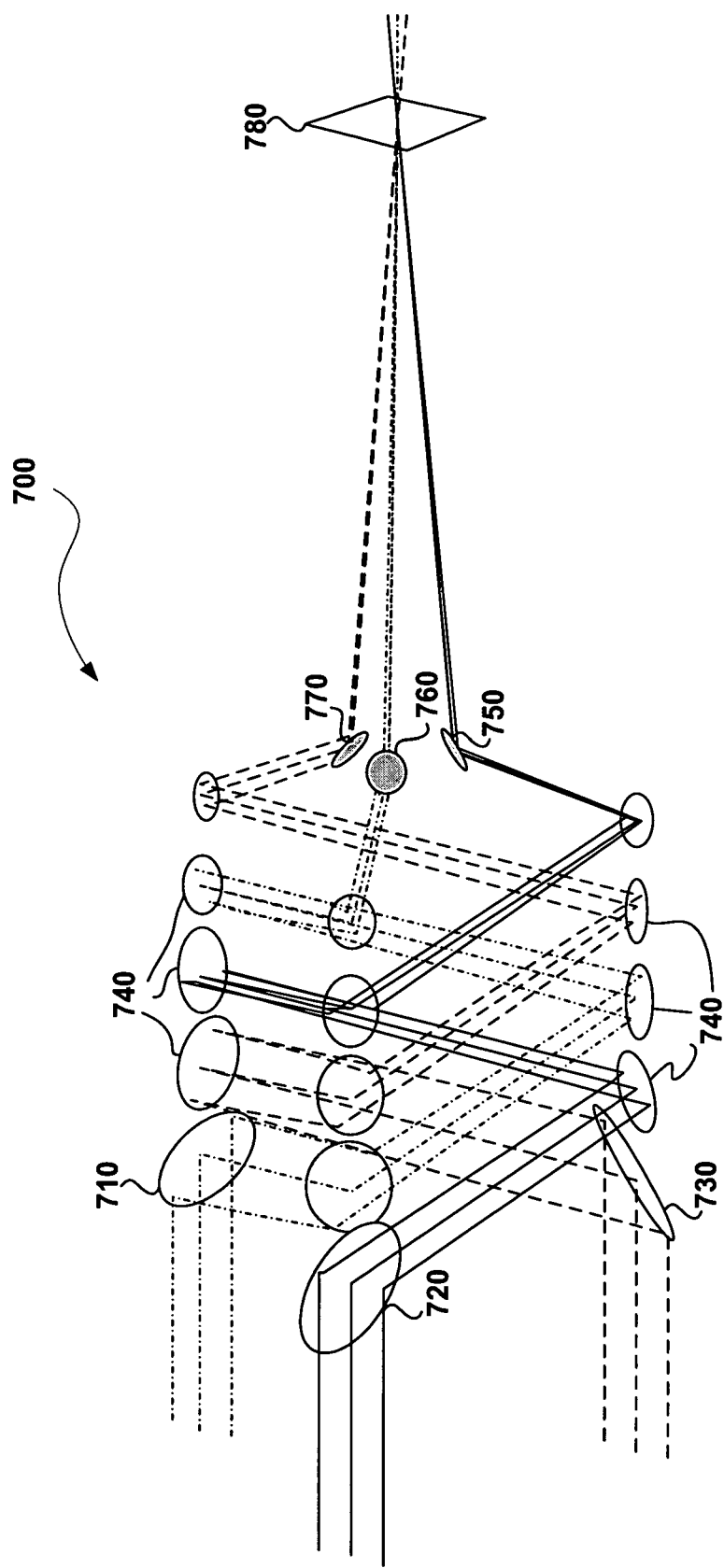
FIG. 7 shows an optical system having three segments according to an exemplary embodiment of the present invention.

FIG. 7 shows an optical system having three segments according to an exemplary embodiment of the present invention. The embodiment of the present invention illustrated in FIG. 3 is merely exemplary and one of ordinary skill in the art will realize that additional segments may be added. For example, twelve, eighteen or more segments may be used in connection with the present invention. Rays of light may be received from a distant source by a first primary mirror segment 710, a second primary mirror segment 720, and a third primary mirror segment 730. These primary mirror segments 710, 720 and 730 may be elliptical in shape, as shown in FIG. 7. Alternatively, these mirrors may have any shape to define the sub-aperture.

After the light has been received at the first, second, and third primary mirror segments, 710, 720, and 730, respectively, the light may be directed along a corresponding chord to another mirror 740. The chord may have an angle with respect to the axial axis of the system. This angle may be, for example, an angle greater than 45 degrees with respect to the axial axis. According to one embodiment of the present invention, primary mirrors 710, 720, and 730 may have a parabolic component.

As shown in FIG. 7, the light may be directed to associated mirrors 740 located about the interior volume of the optical system. These mirrors may be, for example, segmented secondary, tertiary, quaternary, or other level-mirrors. These mirrors may be, for example, fold mirrors. Alternatively, any type of mirror may be used with mirrors 740. Each of these mirrors maybe configured to direct a principal ray of the beam of light received from one of the primary mirrors, for example, at an angle that is greater than 45 degrees with respect to an axial axis of the optical system. Once the light has been effectively reflected and spiraled through the volume of the telescope, the light may be received by a respective one of the mirrors 750, 760, or 770, and may be directed by the mirrors 750, 760, or 770 to the image plane 780. An exemplary path taken by rays though the system is shown in FIG. 7, using a solid and two types of dashed lines indicating the optical path that the light takes through the optical system 700.

A method of constructing a compact-depth optical system will now be described. The first step that may be employed in design of a spiral telescope using a traditional telescope configuration includes choosing the number and the size of the sub-apertures. After the number and size of the sub-apertures have been selected, the primary mirrors may be segmented. Additionally, secondary tertiary or even quaternary mirrors may be segmented as well. Additional mirrors may be segmented as well as applicable. After the mirrors have been segmented, a chord span may be determined. This chord span may be determined based on, for example, a pitch ratio that may be predetermined to be optimal by the system designer.

After the chord span has been selected, tilt may be added to the figure of the primary mirror segments. Note that this is quite different from merely tilting the primary segments. The figure for a mirror segment is an equation describing the surface as a function of the aperture coordinates, e.g. $z=f(x,y)$. Tilt in an arbitrary direction can be described by $z=t_x x + t_y y$, where $t_x$ and $t_y$ are the amounts of tilt in the x and y directions, respectively.) This tilting may configure the mirror to direct the chief ray along the appropriate chord through the optical system. After this has been completed, flat mirrors may be added either below or above the primary mirror segments. These mirrors may be parallel to and facing the axial axis of the optical system. At the point where the optical path along a segment chief ray is the same as the distance between the primary segments and the secondary segment of the original design, secondary segments may be added. The pitch ratio may be adjusted until the secondary segments are located in the same plane as the flat mirrors.

Additionally, the method of designing a compact-depth telescope may include selecting a second chord span and pitch ratio for the next section of the telescope. Additional tilt to the secondary mirror figures, which, to reiterate is not the same as tilting the segments may be added so as to direct the chief ray along the next chord.

These steps may be repeated for additional mirror surfaces disposed within the optical system. When too little optical path remains for the chief ray to traverse another chord a mirror may be added to direct the chief ray towards the telescope axis. This ray may be intercepted with another mirror at a distance from the axis equal to where the ray in the original design would be after traversing the same optical path and direct it towards the image plane.

According to another embodiment of the present invention, actuators may be added to the last set of mirrors to permit aligning of the segments. These same actuators may be used to steer the field of view of the telescope off axis while maximizing the off-axis Strehl ratio and effect phase diversity for improved image reconstruction. According to other aspects of the present invention, actuators may be added to other mirror segments to aid in alignment and aberration management.

This spiral telescope may be configured to have a modular structure, with struts extending below the primary segments. These struts may be configured to support the flat mirrors and secondary segments. According to one embodiment of the present invention, each strut may be identical to the others. There are many potential embodiments of a mechanical structure that may be used in connection with the present invention. Requirements of such a structure are that the structure be rigid and capable of maintaining the position of the mirrors with relatively tight tolerances. Additionally, the superstructure associated with the system may be collapsible, permitting an even more compact design for deployment and consuming less space in a launch vehicle.

According to an embodiment of the present invention, and as may be seen in, for example, FIGS. 6A–6D, the space at the middle of the cavity of the optical system may be empty and light need not pass through the center as it propagates along the individual chord lengths throughout the system. In one embodiment of the invention, an additional compact telescope 621 may be positioned in this empty space proximate to the axis of the optical system. In yet another embodiment, imaging electronics or other optical or mechanical structures (represented by dashed circle 621) may be located proximate to the axis of the optical system.

Numerous other configurations of a compact-depth spiral telescope may be implemented based on the present disclosure. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims. For example, various aperture configurations may be employed. Additionally, the present invention is not intended to be limited to any particular superstructure or mechanical structure as long as the structure is rigid and retains the mirror segment alignment within the predetermined tolerances.

The invention claimed is:

1. An optical system having an axial axis, comprising:
   a first primary mirror segment, a second primary mirror segment and a third primary mirror segment, each of the first primary mirror segment, the second primary mirror segment, and the third primary mirror segment being radially disposed about the axial axis of the optical system;
   a first reflector, a second reflector, and a third reflector arranged around the axial axis, the first, second, and third primary mirror segments being configured to reflect a corresponding plurality of principal rays along a first plurality of chords to the firsts, second, and third reflectors, the first, second, and third reflectors being configured to reflect the corresponding plurality of principal rays along a second plurality of chords, the first plurality of chords and the second plurality of chords having an angle in excess of 45 degrees with respect to the direction of the axial axis, and such that the reflected principal rays do not pass through the axial axis of the optical system, the principal rays being reflected such that a path of the reflected principal rays represents a piecewise linear spiral about the axial axis; and
   a plurality of secondary reflectors configured to receive a respective one of the plurality of principal rays and direct the plurality of principal rays to an image plane.

2. The optical system of claim 1, wherein the first, second, and third reflectors and the plurality of secondary reflectors are configured to reduce the depth of the optical system.

3. The optical system of claim 1, wherein an image of the source is formed upon the image plane.

4. The optical system of claim 1, wherein the first, second, and third reflectors includes secondary mirror segments.

5. The optical system of claim 1, wherein the light is received at a first end of the optical system and the plurality of secondary reflectors is located at a second end of the optical system.

6. The optical system of claim 5, wherein the image plane is located substantially at the first end.

7. The optical system of claim 5, wherein the image plane is located at a plane beyond the second end.

8. The optical system of claim 1, each of the primary mirror segments defining an input aperture, wherein the input aperture is substantially circular and at least one of the first primary mirror segment, the second primary mirror segment and the third primary mirror segment is an elliptical reflector.

9. The optical system of claim 1, wherein at least one of the first, second and third reflectors are fold mirrors.

10. The optical system of claim 1, wherein the first primary mirror segment has a cross section that has a parabolic component.

11. The optical system of claim 1, wherein the optical system functions as a beam expander.

12. The optical system of claim 1, wherein the optical system functions as a telescope.

13. The optical system of claim 1, the optical system being a first optical system, wherein a second optical system is disposed within a volume formed by the first, second and third primary mirror segments and the first, second and third reflectors disposed about the axial axis of the optical system, such that an axial axis of the second optical system is proximate to the axial axis of the first optical system.

* * * * *